March 14, 1939. J. N. McCLURE 2,150,838

MECHANICAL INTERLOCK MULTIPLE APPARATUS CONTROLLER

Filed March 1, 1937 2 Sheets-Sheet 1

Inventor:
JAMES N. McCLURE,
by his Attorneys.

March 14, 1939.　　　　J. N. McCLURE　　　　2,150,838
MECHANICAL INTERLOCK MULTIPLE APPARATUS CONTROLLER
Filed March 1, 1937　　　2 Sheets-Sheet 2
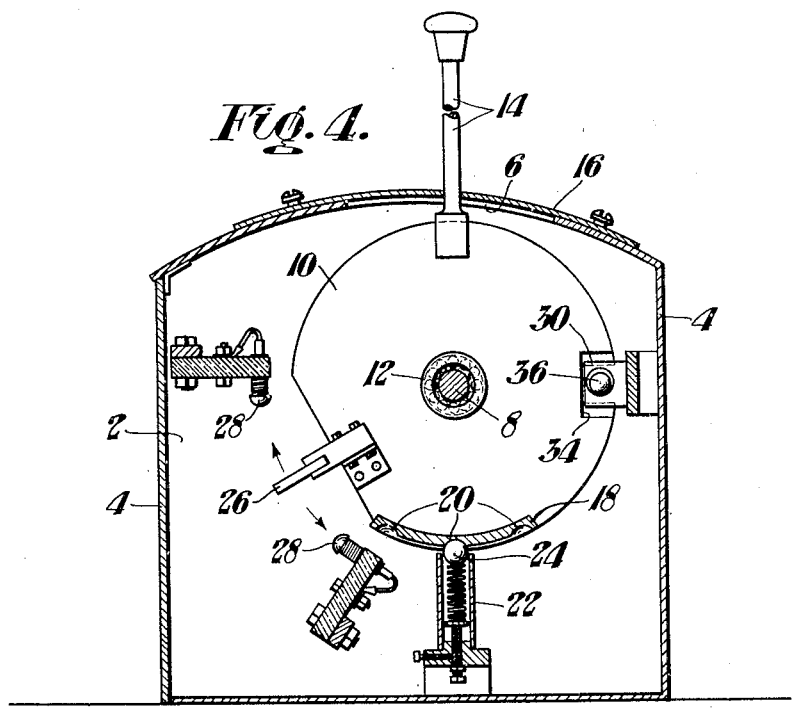
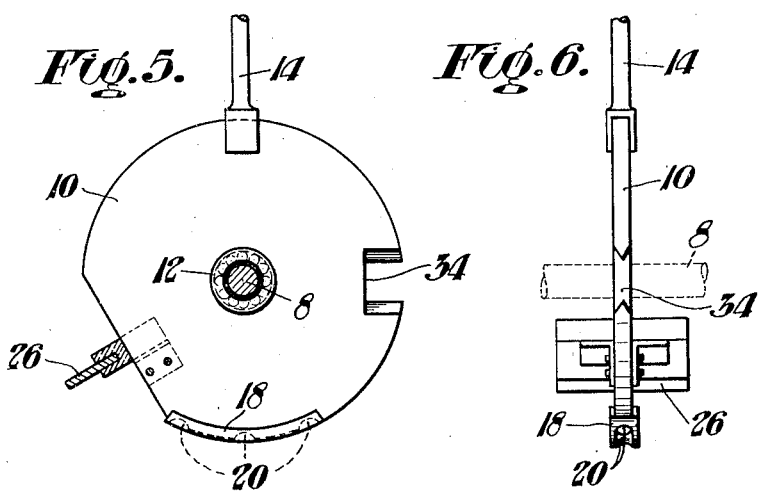
Inventor:
JAMES N. McCLURE,
by: Isnin & Rauber
his Attorneys.

Patented Mar. 14, 1939

2,150,838

UNITED STATES PATENT OFFICE 2,150,838

MECHANICAL INTERLOCK MULTIPLE APPARATUS CONTROLLER

James N. McClure, Monongahela, Pa.

Application March 1, 1937, Serial No. 128,520

10 Claims. (Cl. 200—50)

This invention relates to interlocked controls, and particularly refers to a control that permits the use of but one of several pieces of correlated apparatus at one time.

The present invention has as one of its objects the provision of a sturdy, compact control for several pieces of correlated apparatus and providing the control with means that prevents more than one of the pieces of apparatus from operating at one time.

The above and further objects will be apparent from the following description and the accompanying drawings, in which:

Figure 4 is a transverse sectional elevation taken on the line IV—IV of Figure 1;

Figure 5 is a side elevation of the movable means for regulating the operation of the apparatus controlled by my invention; and Figure 6 is an elevation of the means shown in Figure 5.

Figure 1:
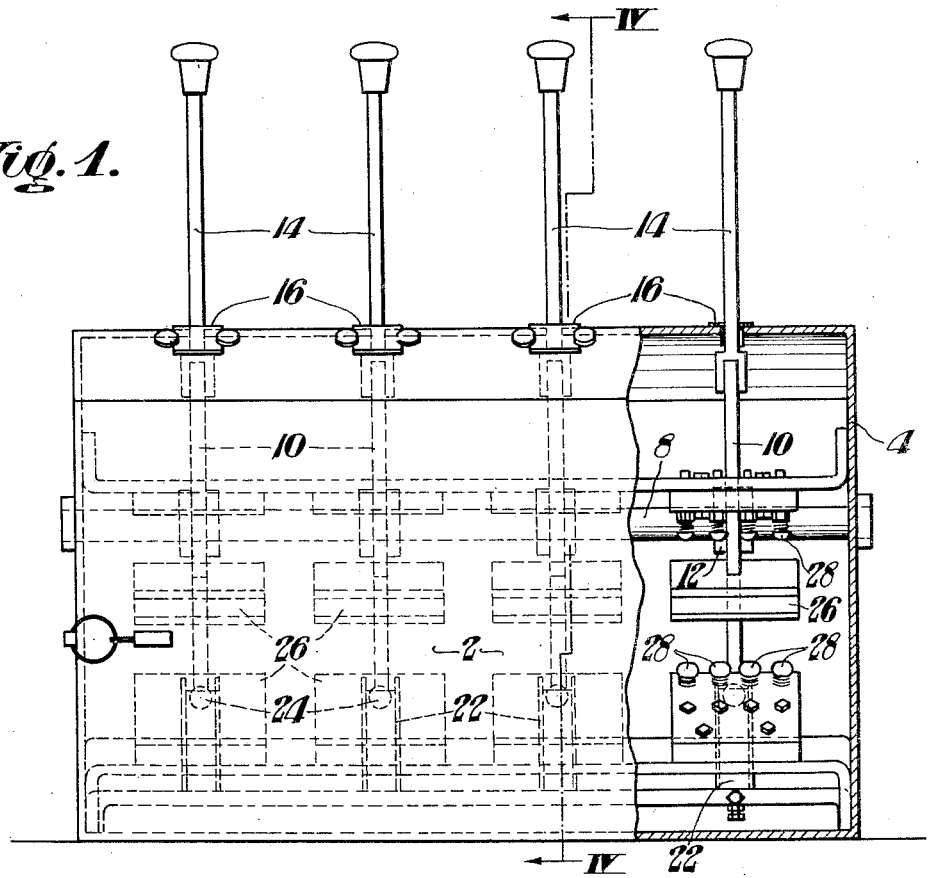
Figure 1 is an elevation, with the cover partly broken away, of an embodiment of my invention.
Figure 2:
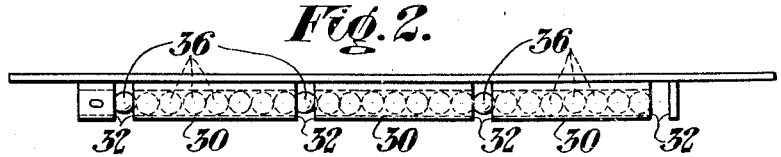
Figure 2 is a plan of the interlocking means used with my invention.
Figure 3:
Figure 3 is an elevation of the interlocking means shown in Figure 2.

Referring to the accompanying drawings, the numeral 2 indicates generally a control which preferably is provided with a housing 4 having a removable side and slots 6 in the top or sides thereof. Means such as a rod 8 is fixed inside the housing 4 so that disks 10 or other suitable supports for contact means can be positively positioned in the housing 4. The position of each of the disks 10 determines whether the piece of apparatus which the contact means that it mounts controls, operates or not and in order to facilitate changing the positions of the disks 10, they are pivotally mounted on the rod 8 by bearings 12. The disks 10 are provided with handles 14 which extend through the slots 6 in the housing 4 and by which the disks 10 are readily moved. To protect the mechanism on the inside of the housing 4 from dirt and dust, the handles 14 preferably carry guards 16 which are adapted to completely cover the slots 6 regardless of the position of the handles 14.

In order to provide the disks 10 with a plurality of positive positions, some of which cause the operation of the piece of apparatus which it represents and some of which positively prevent operation of that piece of apparatus, means, such as arcuate shoes 18, are carried by the disks 10. The shoes 18 are preferably positioned on the circumference of the disks 10 and provided with a plurality of ball-receiving sockets 20. Associated with the shoes 18 and positively positioning the disks 10 in a plurality of positions are pawls 22. The pawls 22 have springs forcing balls 24 out of the pawls 22 and they are mounted in the housing 4 in such a manner that the balls 24 bear upon the shoes 18. When the disks 10 are in certain definite positions the balls 24 are received in the sockets 20. The positions or the springs of the pawls 22 are preferably adjustable so that the balls 24 can always be forcibly held against the shoes 18. By providing this ball and socket arrangement, which gives the disks 10 a plurality of positive positions, the operator of the control 2, by moving the handles 14, can move the disks 10 from one positive position to another along the predetermined arc covered by the shoes 18.

The disks 10 mount contact means of any desired type so that the operation of a plurality of correlated machines, valves, signals, or the like, can be controlled thereby. As shown in the accompanying drawings, I have chosen an electrical control as a practical example of the means used to control the apparatus although a mechanical control can be used to good advantage with valves, or the like. Contact means, such as insulated contact bars 26, are carried by the disks 10 and preferably extend radially therefrom. In many instances the machines controlled by the control 2 are adapted to be run forward and backward or at half and full speed so that it is expedient to provide two contact buttons 28 for each of the contact bars 26. The contact buttons 28 are secured in the housing 4 so that the contact bars 26 bear thereon only when the disks 10 are in their positive positions at the extremities of their arcuate movement. The contact bars 26 and the contact buttons 28 are, of course, provided with suitable electrical connections so that the machines operate in the desired manner when the circuits are closed by the contact bars 26 bearing on the contact buttons 28.

Many systems of correlated apparatus can have but one piece thereof operating at one time and it is with these systems that the control 2 is adapted to be used. Means are provided which positively interlock in such a manner that but one of the contact bars 26 can be made to bear upon the contact buttons 28 at one time. These means include a tube or a series of aligned tubes 30 having slots therein or spaces 32 therebetween. The tubes 30 are fixedly positioned in the housing 4 so that the disks 10 are snugly received in the spaces 32. Each of the disks 10 is provided with a recess 34 that preferably is in the circumference thereof and has a pair of parallel, beveled edges. The recesses 34 are placed in the disks 10 so that when the contact bars 26 are positively positioned apart from both of the contact buttons 28 associated therewith, the recesses 34 are engaged with the spaces 32 between the tubes 30.

Means, such as balls 36, are placed in the tubes 30 and nearly fill the tubes 30 and the spaces 32 therebetween. The balls 36 have a larger diameter than the width of the spaces 32 and are adapted to fill the spaces 32 when the recesses 34 are engaged therewith. The balls 36 do not completely fill the tubes 30 and spaces 34 so that one of the disks 10 can be moved to disengage the recess 34 therein from the corresponding space 32. Then the body of the disk 10 is in the space 32 and it, with the balls 36, prevents any more of the recesses 34 from being disengaged from the spaces 32 by filling the tubes 30 and the spaces 32. No other disk 10 can then be moved as the balls 36 prevent the recesses 34 from being disengaged from the spaces 32.

As the recess 34 of but one disk 10 can be disengaged from the spaces 32 at one time and the disks 10 are so positioned that the contact bars 26 do not bear on the contact buttons 28 when the recesses 34 are engaged with the spaces 32, it follows that but one contact can be made at one time. This means that but one piece of apparatus can be operated at one time and the remainder thereof is, by a positive mechanical interlock, prevented from operating at the same time.

While there is shown and described one specific embodiment of the invention, it will be understood that it is not to be limited exactly thereto, since various modifications may be made without departing from the scope of the invention, as defined by the following claims.

I claim:

1. Apparatus for mechanically preventing more than one of a plurality of correlated pieces of apparatus from operating at one time, said apparatus comprising a support, members having slots therein pivotally mounted on said support, means for moving said members, means positioning said members in a plurality of positions and limiting their movement to a predetermined arc, contact means secured adjacent said support, contact means carried by said members and adapted to engage with said first named contact means when said members are in certain of their fixed positions to control said apparatus, aligned tubes spaced apart and positioned so that said slots in said members engage with the space between said aligned tubes when said contact means are not engaged and means in said tubes permitting the engagement of but one of said second named contact means with said first named contact means by locking the remainder of said slots in engagement with the spaces between said tubes.

2. Apparatus for mechanically preventing more than one of a plurality of correlated electrical circuits from being closed at one time, said apparatus comprising a positively positioned member, disks each of which is provided with a slot therein pivotally positioned on said member, a handle secured to each of said disks, means adapted to positively position each of said disks in a plurality of positions along a predetermined arc, contact bars one of which is secured to each of said disks, contact buttons positioned so that said contact bars bear thereon when said disks are at either extremity of their positive positions, aligned tubes which are fixedly positioned and provided with space therebetween adapted to receive said disks, said disks being so positioned that said slots therein engage with the space between said tubes when said contact bars are positioned apart from said contact buttons and a plurality of means filling said tubes and said spaces therebetween except for an amount at least equal to the thickness of one of said disks and less than the thickness of two of said disks whereby the slot of but one disk can be disengaged from said spaces at one time.

3. Apparatus for mechanically preventing more than one of a plurality of correlated electrical circuits from being closed at one time, said apparatus comprising a housing, a member mounted in said housing, disks each of which is provided with a slot extending into the circumference thereof pivotally positioned on said member, a handle secured to each of said disks and extending through said housing, means adapted to positively position each of said disks in a plurality of positions along a predetermined arc, contact bars one of which is secured to each of said disks, contact buttons secured in said housing so that said contact bars bear thereon when said disks are at either extremity of their positive positions, aligned tubes secured in said housing and provided with space therebetween which is adapted to receive said disks, said disks being so positioned that said slots therein engage with the space between said tubes when said contact bars are positioned apart from said contact buttons and a plurality of balls filling said tubes and the space therebetween except for an amount at least equal to the thickness of one of said disks and less than the thickness of two of said disks, whereby the slot of but one disk can be disengaged from said tubes at one time.

4. Apparatus for mechanically preventing more than one of a plurality of correlated electrical circuits from being closed at one time, said apparatus comprising a housing having slots therein, a member mounted in said housing, disks each of which is provided with a slot extending into the circumference thereof pivotally positioned on said member, a handle secured to each of said disks and extending through a slot in said housing, means adapted to positively position each of said disks in a plurality of positions along a predetermined arc, contact bars one of which is secured to each of said disks, contact buttons secured in said housing so that said contact bars bear thereon when said disks are at either extremity of their positive positions, a tube secured in said housing and provided with slots that receive said disks, said disks being so positioned that said slots therein engage with said slots in said tube when said contact bars are positively positioned apart from said contact buttons and a plurality of balls having a diameter larger than the thickness of said disks positioned in said tube and filling it except for an amount at least equal to the thickness of one of said disks and less than the thickness of two of said disks whereby the slot of but one disk can be disengaged from said tube at one time.

5. A mechanical interlock for use with correlated electrical apparatus comprising a housing having slots therein, a rod secured in said housing, disks pivotally secured to said rod and provided with a recess having a pair of parallel beveled edges in the circumference of each disk, handles secured to said disks and extending through said slots in said housing, arcuate shoes having a plurality of sockets in their outer surfaces secured to said disks at the circumference thereof, pawls provided with springs forcing balls out of said pawls positioned so that said balls forced against said shoes cooperate with said sockets to positively position said disks in a plurality of positions along a predetermined arc, insulated contact bars secured to said disks and projecting radially therefrom, insulated contact buttons secured in said housing so that said contact bars bear thereon when said disk is at either extremity of its positive positions, wires extending from said contact bars and buttons to said correlated electrical apparatus, a tube secured in said housing and provided with slots that are adapted to receive said disks, said disks being so positioned that said recesses therein engage with said slots in said tube when said contact bars are positively positioned apart from said contact buttons and a plurality of balls having a larger diameter than the width of said slots in said tube positioned in said tube whereby but one of said recesses in said disks can be disengaged from said slots in said tube at one time as said balls fill all of the remaining slots therein and thereby positively prevent more than one of said contact bars from contacting said contact buttons at one time.

6. A mechanical interlock for use with correlated electrical apparatus comprising a housing having slots therein, a rod secured in said housing, disks on said rod and provided with a recess having a pair of parallel beveled edges in the circumference of each disk, bearings mounting said disks on said rod, handles secured to said disks and extending through said slots in said housing, guards covering said slots carried by said handles, arcuate shoes having a plurality of sockets in their outer surfaces secured to said disks at the circumference thereof, pawls provided with springs forcing balls out of said pawls positioned so that said balls are forced against said shoes and cooperate with said sockets to positively position said disks in a plurality of positions along a predetermined arc, insulated contact bars secured to said disks and projecting radially therefrom, insulated contact buttons secured to said housing so that said contact bars bear thereon when said disks are at either extremity of their positive positions, wires extending from said contact bars and buttons to said correlated electrical apparatus, a tube secured in said housing perpendicular to said disks and provided with slots that are adapted to receive said disks, said disks being so positioned that said recesses therein engage with said slots in said tube when said contact bars are positively positioned apart from said contact buttons and a plurality of balls having a larger diameter than the width of said slots in said tube positioned in said tube whereby but one of said recesses in said disks can be disengaged from said slots in said tube at one time as said balls fill all of the remaining slots therein and thereby mechanically prevent more than one of said contact bars from contacting said contact buttons at one time.

7. In a device of the class described, a plurality of correlated members arranged in side-by-side relation, means for moving said members a predetermined distance, contact means carried by each of said members, and a plurality of aligned locking means arranged longitudinally of said correlated members with which said correlated members are adapted to cooperate, said locking means adapted to permit movement of any one of said members into contacting position and to automatically lock the other of said members against movement.

8. In a device of the class described, a plurality of correlated members rotatably mounted in spaced parallel relation, means for moving said members in a predetermined arc, contact means carried by each of said members, and a plurality of aligned locking members arranged longitudinally of said correlated members with which they are adapted to cooperate, said locking members adapted to permit movement of any one of said correlated members into contacting position and to automatically lock the other of said members against movement.

9. In a device of the class described, a plurality of disks rotatably mounted in parallel spaced relation on a shaft, means for moving said disks on said shafts in either direction through a predetermined arc, contact means carried by each of said disks, and a plurality of aligned locking members arranged longitudinally of said disk parallel to said shaft and with which said disks are adapted to cooperate, said members adapted to permit movement of any one of said disks in either direction into contacting position and to automatically lock the other of said disks against movement.

10. In a device of the class described, a plurality of correlated members arranged in a row in side-by-side relation, contact control means carried by said members, said members adapted to be moved in planes parallel to one another into contacting position, and locking means arranged longitudinally of the row of said members consisting of a plurality of aligned members with which said correlated members are adapted to cooperate, any one of said correlated members adapted to move said aligned locking members so as to cause the same to engage and lock the other of said correlated members against movement while said selected correlated member is in contacting position.

JAMES N. McCLURE.